(12) United States Patent
Johnsson

(10) Patent No.: US 11,235,238 B2
(45) Date of Patent: Feb. 1, 2022

(54) METHOD AND APPARATUS FOR PROVIDING A COMPUTER IMPLEMENTED GAME

(71) Applicant: KING.COM LIMITED, St. Julians (MT)

(72) Inventor: Anton Johnsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 84 days.

(21) Appl. No.: 16/727,859

(22) Filed: Dec. 26, 2019

(65) Prior Publication Data

US 2021/0197085 A1  Jul. 1, 2021

(51) Int. Cl.
| | |
|---|---|
| *A63F 13/426* | (2014.01) |
| *A63F 13/80* | (2014.01) |
| *A63F 13/30* | (2014.01) |
| *A63F 13/23* | (2014.01) |
| *A63F 13/2145* | (2014.01) |

(52) U.S. Cl.
CPC ........ *A63F 13/426* (2014.09); *A63F 13/2145* (2014.09); *A63F 13/23* (2014.09); *A63F 13/30* (2014.09); *A63F 13/80* (2014.09)

(58) Field of Classification Search
CPC .... A63F 13/426; A63F 13/2145; A63F 13/23; A63F 13/30; A63F 13/80
See application file for complete search history.

(56) References Cited

U.S. PATENT DOCUMENTS

| | | | |
|---|---|---|---|
| 2014/0080560 A1* | 3/2014 | Knutsson | A63F 13/46 463/10 |
| 2018/0025590 A1* | 1/2018 | Ballone | C08L 1/14 463/21 |

* cited by examiner

*Primary Examiner* — Yingchuan Zhang
(74) *Attorney, Agent, or Firm* — Saul Ewing Arnstein & Lehr LLP

(57) ABSTRACT

A game board is displayed on a display of a computer device. When a user engages with one or more game elements in a move, at least one processor of the computer device determines a first characteristic of a game element associated with the triggering of a first game element, a first direction associated with the triggering and a first set of locations along the first direction. The at least one processor is configured to associate each location of the determined first set of locations with a game element having the determined first characteristic.

26 Claims, 15 Drawing Sheets

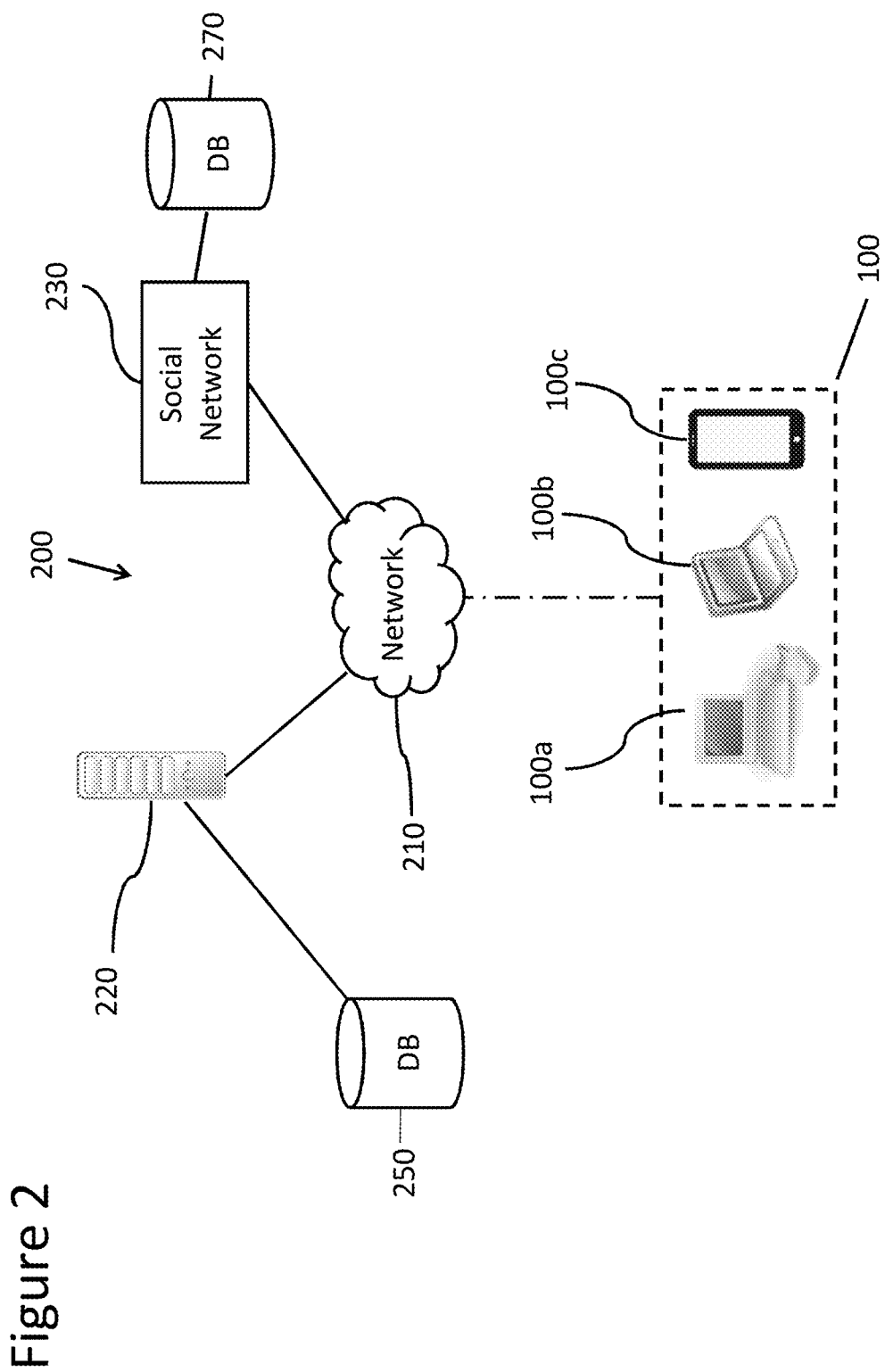

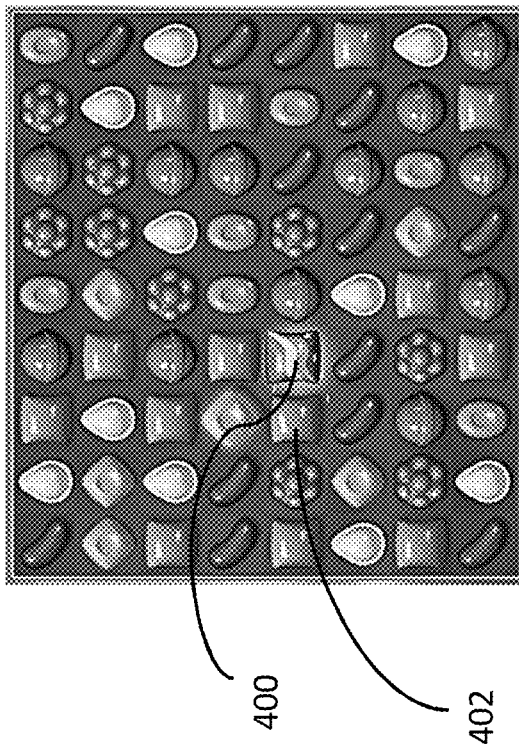
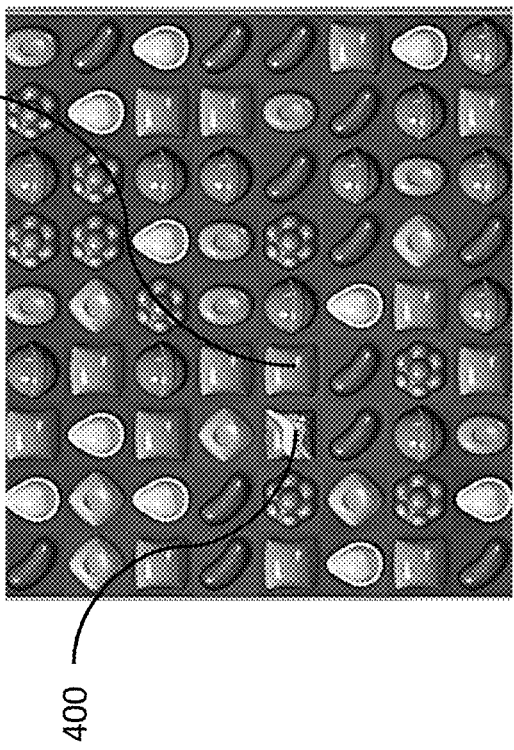

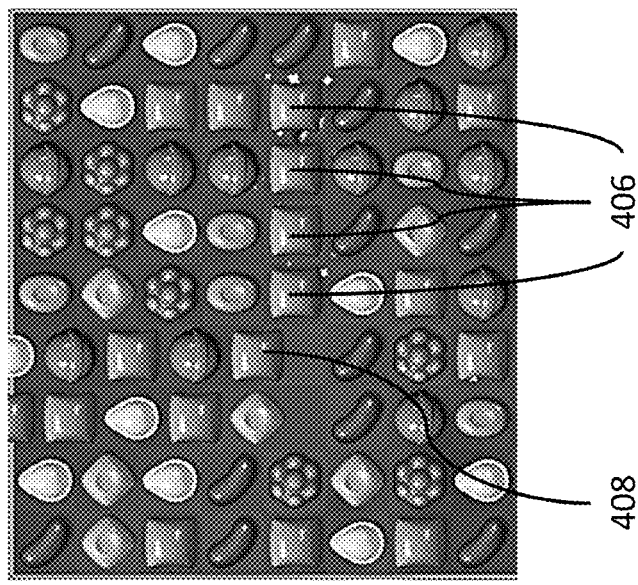
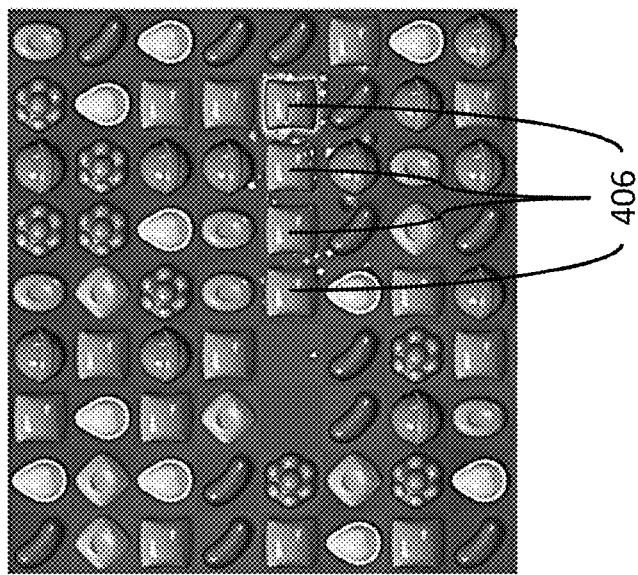

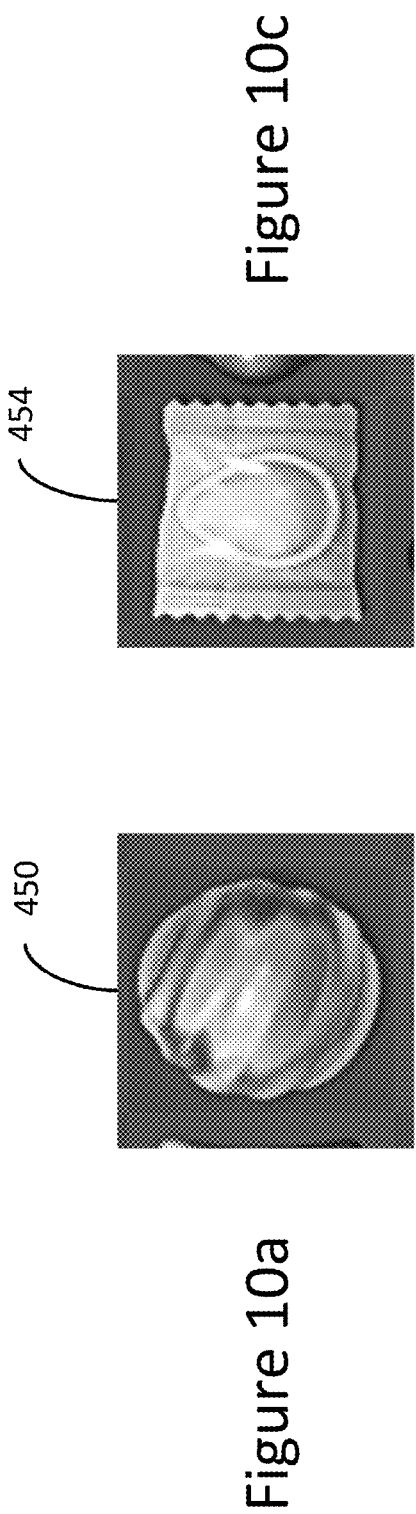
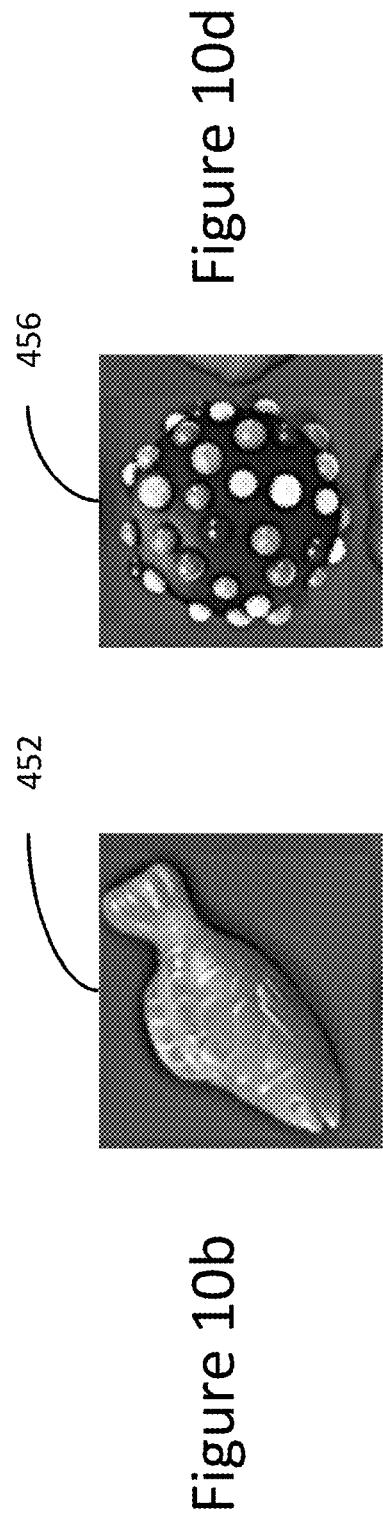
Figure 10a  Figure 10b  Figure 10c  Figure 10d

METHOD AND APPARATUS FOR PROVIDING A COMPUTER IMPLEMENTED GAME

FIELD OF THE INVENTION

Embodiments of this application relate to a user device for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade mark Candy Crush. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking adjacent game elements.

A technical challenge exists when introducing complexity into such match games. In particular it is desirable to be able to control the difficulty of a particular game level. It is desirable for the player to have some control over the game play. It can be technically challenging to achieve one or more of these objectives where a user makes a move, leading to the removal of game elements. The replenishment of these game elements can set off a "chain reaction" where the replenished game elements make a match and so on.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

Some aspects may provide improved methods of controlling a user interface in the context of a computer-implemented game of a matching type (switcher, clicker or linker). Some aspects may provide a solution to the technical problem of improved user engagement by providing a new user engagement mode, which is implemented by a processor in a computer device.

According to an aspect, there is provided a computer device comprising: a display configured to display game elements in a game board comprising tiles having a background appearance, each game element supported by a respective tile and at least one of the game elements, when triggered, causing a first effect; a user interface configured to detect user input when a user engages with one or more game elements in a move; and at least one processor configured: to determine when the user engages with at least one game element that this causes a first game element to be triggered which causes the first effect; to, in response to determining that the first game element associated with the first effect is triggered, determine a first characteristic of a game element associated with the triggering of the first game element, determine a first direction associated with the triggering of the first game element; and determine a first set of locations on the game board along the first direction, each location of the determined first set of locations associated with a displayed respective game element having a respective characteristic; wherein the at least one processor is configured to associate each location of the determined first set of locations with a game element having the determined first characteristic.

The at least one processor may be configured to identify a set of locations on the game board along the first direction and to determine the first set of locations based on the identified set of locations.

The first set of locations may be a subset of the set of locations.

The at least one processor may be configured to identify a predefined number of locations as the identified set of locations.

The predefined number may be four. The predefined number may be more or less than four in other embodiments.

The at least one processor may be configured to identify up to a predefined maximum number of locations as the identified set of locations.

The predefined maximum number may be four. The predefined maximum number may be more or less than four in other embodiments.

The at least one processor may be configured to determine if a characteristic of one or more of the displayed respective game elements associated with the identified set of locations on the game board along the first direction is a blocking characteristic.

The at least one processor may be configured to determine the first set of locations based on the identified set of locations based on one or more criteria.

The criteria may be that a respective location is not associated with a respective game element having a blocking characteristic.

The at least one processor may be configured to determine a predefined number of locations as the first set of locations.

The predefined number may be four. The predefined number may be more or less than four in other embodiments.

The at least one processor may be configured to determine up to a predefined maximum number of locations.

The predefined maximum number may be four.

The determined first set of locations may be determined with respect to a location of the first game element.

At least one of the game elements associated with a respective location of the determined first set of locations may be provided with one or more further characteristics.

The further characteristic may be a line blasting characteristic associated with one or more directions.

At least one of the game elements associated with a respective location of the determined first set of locations may cause a different effect when triggered.

The different effect may be a line blasting effect or a spreading effect associated with one or more directions.

The at least one processor may be configured to cause the display to display an updated game board with the respective associated game element having the determined first characteristic displayed at a respective location of the determined first set of locations.

The computer device may comprise at least one memory configured to store for each game element, one or more of data defining a characteristic of the respective game element, data defining a location on the game board of the respective game element, and optionally data indicating one or more effects associated with the triggering of the respective game element.

The data for each game element may be stored in a data structure.

The at least one processor may be configured to update the data stored in the at least one memory for a respective game element with the first characteristic.

The at least one processor may be configured to modify a characteristic of a displayed respective game element to the first characteristic.

The at least one processor may be configured to generate data for at least one new game element having the first characteristic to replace data stored in the at least one memory for a respective game element in the first set of locations.

The at least one processor may be configured to generate at least one new game element having the first characteristic to replace a respective game element in the first set of locations.

The at least one processor may configured to generate data for at least one new game element having the first characteristic to replace data stored in a data structure in the at least one memory for a respective game element in the first set of locations.

The at least one processor may be configured to remove data from the at least one memory, the data associated with a respective game element in a respective location of the first set of locations and replace that data in the memory with data associated with a game element having the first characteristic.

The at least one processor may be configured to remove data from a data structure in the at least one memory, the data associated with a respective game element in a respective location of the first set of locations and replace that data in the data structure with data associated with a game element having the first characteristic.

The at least one processor may be configured to remove a respective game element in a respective location of the first set of locations and replace the respective game element with a game element having the first characteristic.

The at least one processor may be configured to determine whether the user input causes a match condition to be satisfied.

The at least one processor may be configured to determine whether the game elements having the first characteristic associated with the determined first set of locations causes a match condition to be satisfied.

The at least one processor may be configured to determine the first characteristic based on a characteristic of the at least one game element that the user engages with to cause the triggering of the first game element to cause the first effect The at least one processor may be configured to determine that the user engagement with at least one game element causes that game element to swap position with the first game element to trigger the first game element to provide the first effect.

The at least one processor may be configured to determine the first direction dependent on a direction associated with the user input causing the triggering of the first game element which causes the first effect.

The at least one processor may be configured to determine the first direction dependent on the at least one game element that the user interacts with that causes the triggering of the first game element which causes the first effect.

The at least one processor may be configured to determine the first direction in dependence on a direction associated with one or more game elements which cause the first game element to be triggered.

The computer device may comprise at least one memory configured to store data for each game element in association with respective tile data.

The at least one processor may be configured to cause the display to display the game elements to be displayed in an arrangement on the game board.

The at least one processor may be configured to cause the display to display the game elements in an arrangement on the game board comprising columns and rows, wherein the first direction comprises a direction along a row or along a column in the arrangement The at least one processor may be configured to determine a second direction associated with the first effect, determine a second set of locations on the game board along the second direction, each location of the determined second set of locations associated with a displayed respective game element having a respective characteristic, and associate each location of the determined second set of locations with a game element having the determined first characteristic.

According to another aspect, there is provided a computer implemented method comprising: causing, by at least one processor of a computer device, display by a display of the computer device, game elements in a game board comprising tiles having a background appearance, each game element supported by a respective tile and at least one of the game elements, when triggered, causing a first effect; detecting, via a user interface of the computer device, user input when a user engages with one or more game elements in a move; determining, by the at least processor, when the user engages with at least one game element that this causes a first game element to be triggered which causes the first effect; and in response to determining that the first game element associated with the first effect is triggered, determining, by the at least processor, a first characteristic of a game element associated with the triggering of the first game element, determining, by the at least processor, a first direction associated with the triggering of the first game element; and determining, by the at least processor, a first set of locations on the game board along the first direction, each location of the determined first set of locations associated with a displayed respective game element having a respective characteristic; wherein the method comprises associating, by the at least one processor, each location of the determined first set of locations with a game element having the determined first characteristic.

The method may comprise identifying, by the at least one processor, a set of locations on the game board along the first direction and determining by the at least one processor, the first set of locations based on the identified set of locations.

The first set of locations may be a subset of the set of locations.

The method may comprise identifying, by the at least one processor, a predefined number of locations as the identified set of locations.

The predefined number may be four. The predefined number may be more or less than four in other embodiments.

The method may comprise identifying, by the at least one processor, up to a predefined maximum number of locations as the identified set of locations.

The predefined maximum number may be four. The predefined maximum number may be more or less than four in other embodiments.

The method may comprise determining, by the at least one processor, if a characteristic of one or more of the displayed respective game elements associated with the identified set of locations on the game board along the first direction is a blocking characteristic.

The method may comprise determining, by the at least one processor, the first set of locations based on the identified set of locations based on one or more criteria.

The criteria may be that a respective location is not associated with a respective game element having a blocking characteristic.

The method may comprise determining, by the at least one processor, a predefined number of locations as the first set of locations.

The predefined number may be four. The predefined number may be more or less than four in other embodiments.

The method may comprise determining, by the at least one processor, up to a predefined maximum number of locations in said first set of locations.

The predefined maximum number may be four.

The determined first set of locations may be determined with respect to a location of the first game element.

At least one of the game elements associated with a respective location of the determined first set of locations may be provided with one or more further characteristics.

The further characteristic may be a line blasting characteristic associated with one or more directions.

At least one of the game elements associated with a respective location of the determined first set of locations may cause a different effect when triggered.

The different effect may be a line blasting effect or a spreading effect associated with one or more directions.

The method may comprise causing, by the at least one processor, to cause the display to display an updated game board with the respective associated game element having the determined first characteristic displayed at a respective location of the determined first set of locations.

The method may comprise storing, in at least one memory, for each game element, one or more of data defining a characteristic of the respective game element, data defining a location on the game board of the respective game element, and optionally data indicating one or more effects associated with the triggering of the respective game element.

In some embodiments, the position of the data for a game element in the data structure may define the location of the game element on the game board.

The data for each game element may be stored in a data structure.

The method may comprise updating, by the at least one processor, the data stored in the at least one memory for a respective game element with the first characteristic.

The method may comprise modifying, by the at least one processor, a characteristic of a displayed respective game element to the first characteristic.

The method may comprise generating, by the at least one processor, data for at least one new game element having the first characteristic to replace data stored in the at least one memory for a respective game element in the first set of locations.

The method may comprise generating, by the at least one processor, at least one new game element having the first characteristic to replace a respective game element in the first set of locations.

The method may comprise generating, by the at least one processor, data for at least one new game element having the first characteristic to replace data stored in a data structure in the at least one memory for a respective game element in the first set of locations.

The method may comprise removing, by the at least one processor, data from the at least one memory, the data associated with a respective game element in a respective location of the first set of locations and replacing that data in the at least one memory with data associated with a game element having the first characteristic.

The method may comprise removing, by the at least one processor, data from a data structure in the at least one memory, the data associated with a respective game element in a respective location of the first set of locations and replacing that data in the data structure with data associated with a game element having the first characteristic.

The method may comprise removing, by the at least one processor, a respective game element in a respective location of the first set of locations and replacing the respective game element with a game element having the first characteristic.

The method may comprise determining, by the at least one processor, whether the user input causes a match condition to be satisfied.

The method may comprise determining, by the at least one processor, whether the game elements having the first characteristic associated with the determined first set of locations causes a match condition to be satisfied.

The method may comprise determining, by the at least one processor, the first characteristic based on a characteristic of the at least one game element that the user engages with to cause the triggering of the first game element to cause the first effect The method may comprise determining, by the at least one processor, that the user engagement with at least one game element causes that game element to swap position with the first game element to trigger the first game element to provide the first effect.

The method may comprise determining, by the at least one processor, the first direction dependent on a direction associated with the user input causing the triggering of the first game element which causes the first effect.

The method may comprise determining, by the at least one processor, the first direction dependent on the at least one game element that the user interacts with that causes the triggering of the first game element which causes the first effect.

The method may comprise determining, by the at least one processor, the first direction in dependence on a direction associated with one or more game elements which cause the first game element to be triggered.

The method may comprise storing in at least one memory of the computer device data for each game element in association with respective tile data.

The method may comprise causing, by the at least one processor, the display to display the game elements to be displayed in an arrangement on the game board.

The method may comprise causing, by the at least one processor, the display to display the game elements in an arrangement on the game board comprising columns and rows, wherein the first direction comprises a direction along a row or along a column in the arrangement.

The method may comprise determining, by the at least one processor, a second direction associated with the first effect, determining a second set of locations on the game board along the second direction, each location of the determined second set of locations associated with a displayed respective game element having a respective characteristic, and associating each location of the determined second set of locations with a game element having the determined first characteristic.

According to another aspect, there is provided a non-transitory computer readable storage device storing instructions that, when executed by at least one processor of a computer device causes the at least one processor to: cause display by a display of the computer device, game elements in a game board comprising tiles having a background appearance, each game element supported by a respective tile and at least one of the game elements, when triggered, causing a first effect; detect, via a user interface of the computer device, user input when a user engages with one or more game elements in a move; determine when the user engages with at least one game element that this causes a first game element to be triggered which causes the first effect; in response to determining that the first game element associated with the first effect is triggered, determine a first characteristic of a game element associated with the triggering of the first game element, determine a first direction associated with the triggering of the first game element; and determine a first set of locations on the game board along the first direction, each location of the determined first set of locations associated with a displayed respective game element having a respective characteristic; and associate each location of the determined first set of locations with a game element having the determined first characteristic.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which:

FIG. 2 shows an example system in which some embodiments may be provided;

FIGS. 5a to 5e show a game board at different times during a move where the game element providing the additional effect is swapped with another game element in a first direction;

FIGS. 10a to 10d show some examples of different game elements providing different additional effects when triggered.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations.

Figure 1:
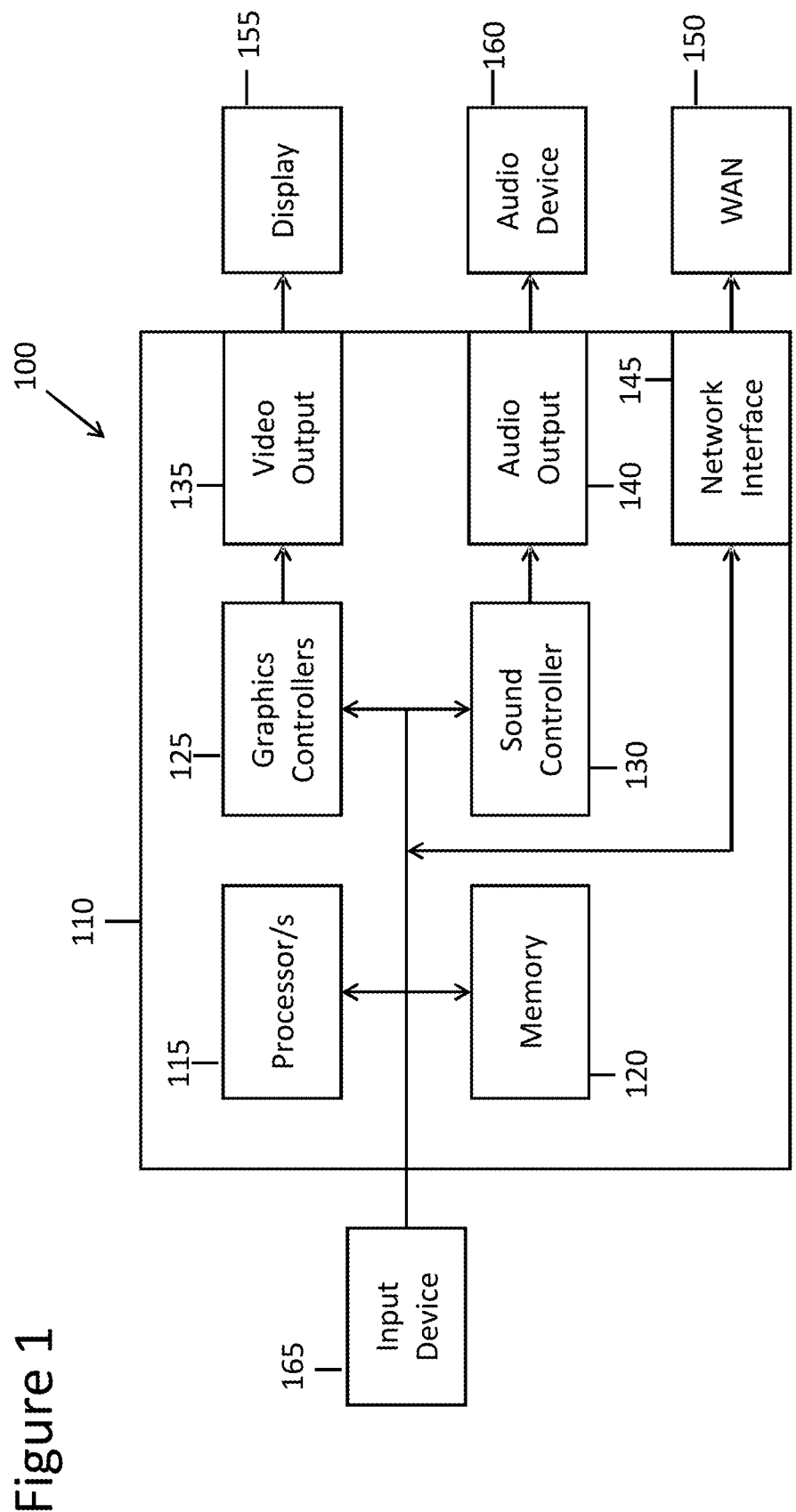
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example. The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

FIG. 2 schematically shows a system 200 according to an embodiment. The system 200 comprises a server 220 which may store or be in communication with a database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 to one or more client or user devices 100, such as the user device 100 shown in FIG. 1 by way of example, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3A:
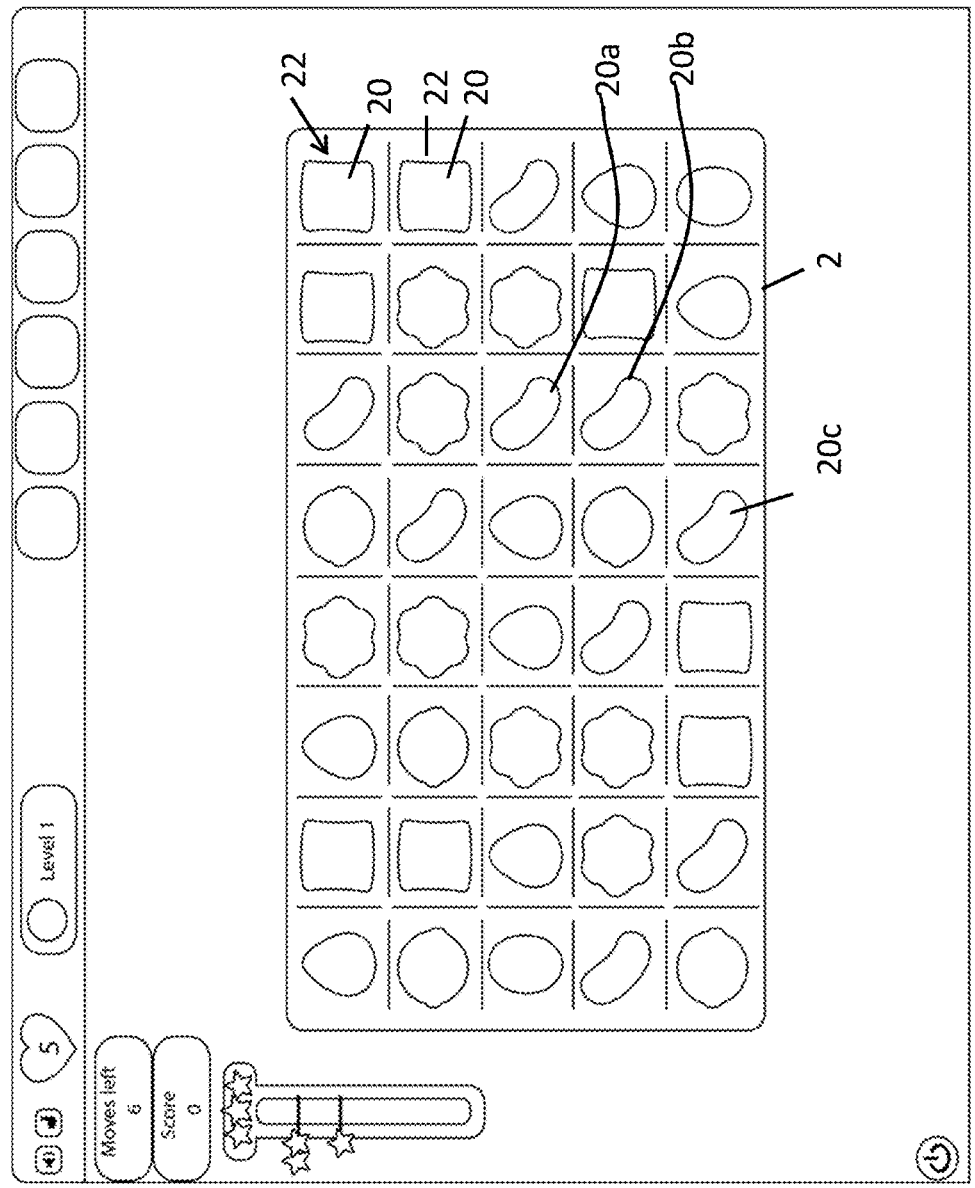
FIG. 3a is a schematic diagram of a game board of a match three game illustrating a basic example of a match three game.

FIG. 3a shows a display of a known version of a match 3 switcher game called Candy Crush Saga™. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 3B:
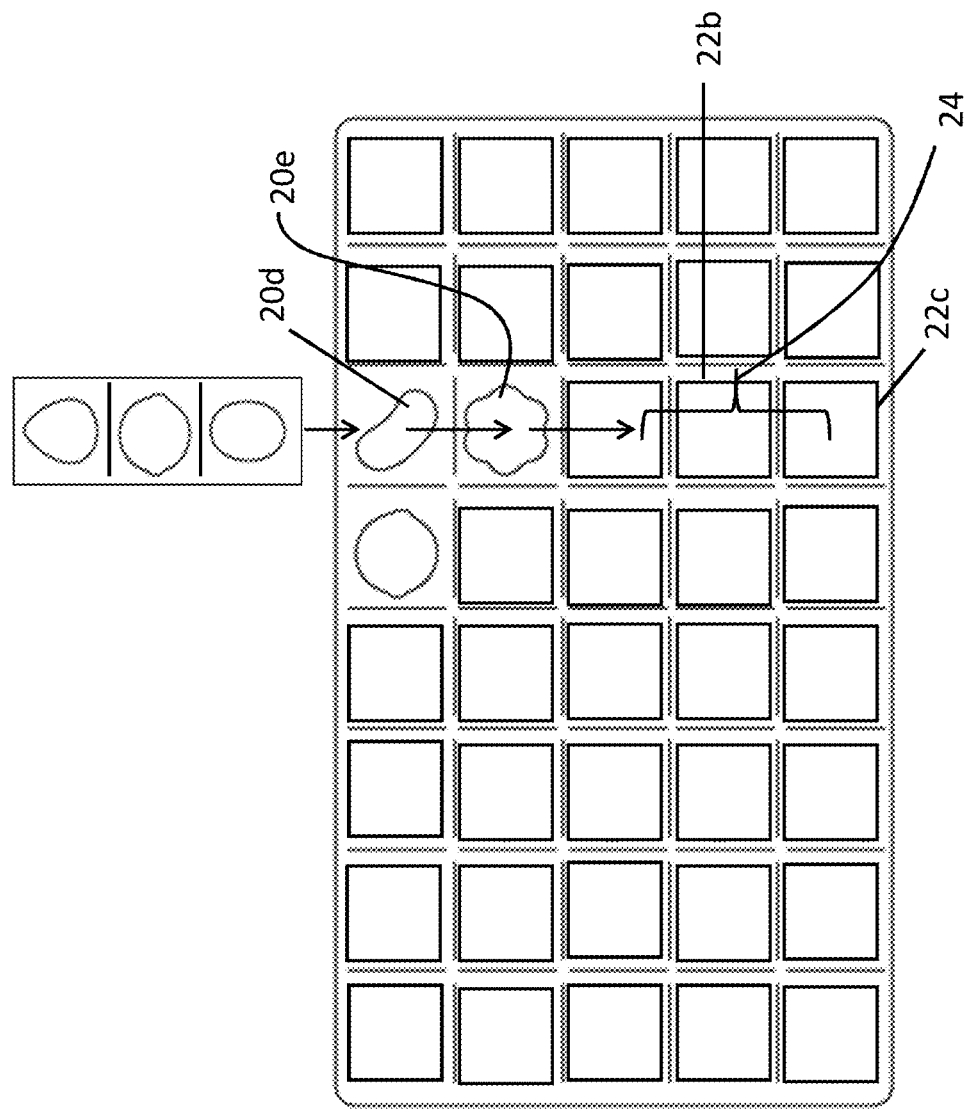
FIG. 3b is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 3a that game element 20c is moved one place to the right to form a three-line match with game elements 20a and 20b. Turning now to FIG. 3b, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

The so-called physics of the game elements on generation of a new game board after each move is the same in the existing version of the game called Candy Crush. That is, game elements drop down from above the game board at a set speeds and from the top of the game board. In an alternative version the physics can vary so that the speed and direction of replacement game elements can alter.

Reference is made to FIGS. 5a-e, which show examples of a game board according to some embodiments.

FIG. 5a shows an example game board may be displayed on a display. The game board comprises a plurality of game elements having different characteristics, such as but not limited to shape, colour, etc. Each game element is provided on a tile having a back ground appearance.

In some example embodiments, the user engagement may cause one game element to swap position with a first game element providing the first additional effect when triggered. For example, as shown in FIGS. 5a and 5b, a user may engage with game element 400, for example by swapping the position of game element 400 with game element 402. FIG. 5b shows the state of the game board immediately after swapping the position of game elements 400 and 402.

Figure 4:
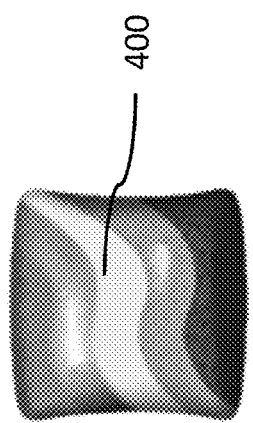
FIG. 4 shows an example of a game element providing an additional effect when triggered.

Game element 400 may provide the additional effect when triggered. This game element is shown in FIG. 4. In this example, the game element is shown with swirls of different colours. This is by way of example only and in different embodiments, the game element may be shown with different visual appearances.

The swapping of the game element 400 with game element 402 may cause the additional effect to be triggered.

When a game element providing a first additional effect is triggered, a direction in which the first additional effect is to be provided may be determined. In some example embodiments, the one or more game elements along the determined direction may be provided with a characteristic of one of the game elements with which the user engages with. The one or more game elements along the determined direction may be in a line.

The determined direction may be based on a direction of user engagement with one or more game elements. That is to say, the method may comprise determining a direction of user engagement, and selecting the one or more game elements along the determined direction in dependence on the determined direction of user engagement.

In the example of FIGS. 5a and 5b, a direction of user input engaging with the game elements may be to the right, thereby swapping the position of game element 400 and game element 402. As such, the determined direction is to the right, as indicated by arrow 404. One or more game elements along the determined direction are determined for the first additional effect to be applied to.

The user engagement may cause the selecting and moving of one of: one game element and the first game element providing the first additional effect when triggered to a position occupied by the other of the one game element and the first game element providing the first additional effect when triggered. The one or more game elements along the determined direction may be provided with the same characteristic in a direction of movement of the moved one of the one game element and the first game element providing the first additional effect when triggered. In some example embodiments, the provided characteristic may be a characteristic of the one game element.

In the example of FIG. 5c, four game elements 406 along the determined direction are determined for the first additional effect to be applied to. The first additional effect may then be applied to the determined four game elements 406, such that each of the game elements 406 has the same characteristic. In the example of FIG. 5c, the provided characteristic is the same characteristic of game object 402, and as such each of game elements 406 has the same shape as game object 402.

The game element 400 and game element 402 may then be removed from the game board. This may cause game elements displayed above the removed game elements to move downwards to fill the gap left by the removed game elements. For example, as shown in FIG. 5d, game element 408 will drop down in to the gap left by the removal of game element 400.

Figure 5E:
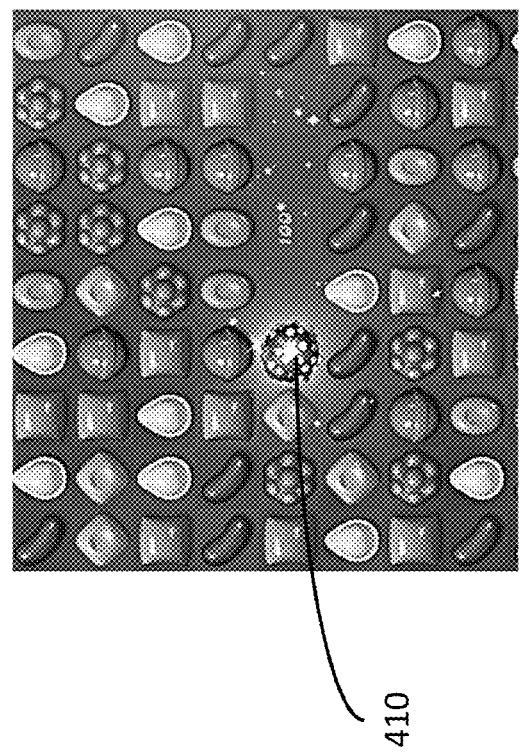

In the example of FIGS. 5a-e, game element 408 has the same characteristic as game elements 406. Thus, when game element 408 drops down in to the gap left by the removal of game element 400, game element 408 and game elements 406 will form a sequence of five game elements in a row having a same characteristic. By creating a sequence of five game elements with the same characteristic, the user may be rewarded by converting the sequence of five game elements in to a special game element 410, as shown in FIG. 5e. The special game element 410, when triggered, may provide a further additional effect different to the first additional effect. This is a so-called colour bomb.

When a colour bomb is swapped with a game element of a given characteristic, the colour bomb will release an energy charge striking all game elements on the game board that match the given characteristic. Those game elements may be removed and/or activated.

It should be appreciated that in any event, a determination is made as to whether a match conditions is satisfied. In this example embodiment, this determination is made after the game board has been replenished. In other embodiments, this determination may be made before the game board is replenished.

In some embodiments, one or both of the two swapped game elements are removed. In other embodiments, only the game element providing the additional effect when triggered may be removed.

Figure 6B:
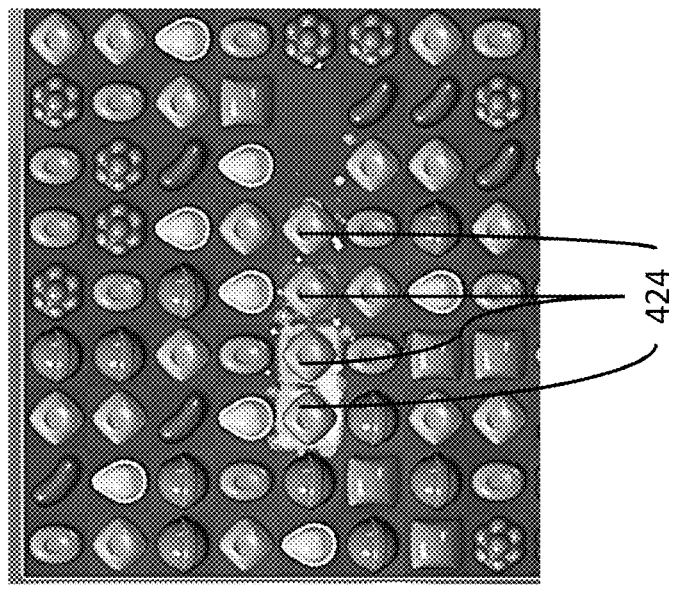
FIGS. 6a to 6c show a game board at different times during a move where the game element providing the additional effect is swapped with another game element in a second direction.
Figure 6A:
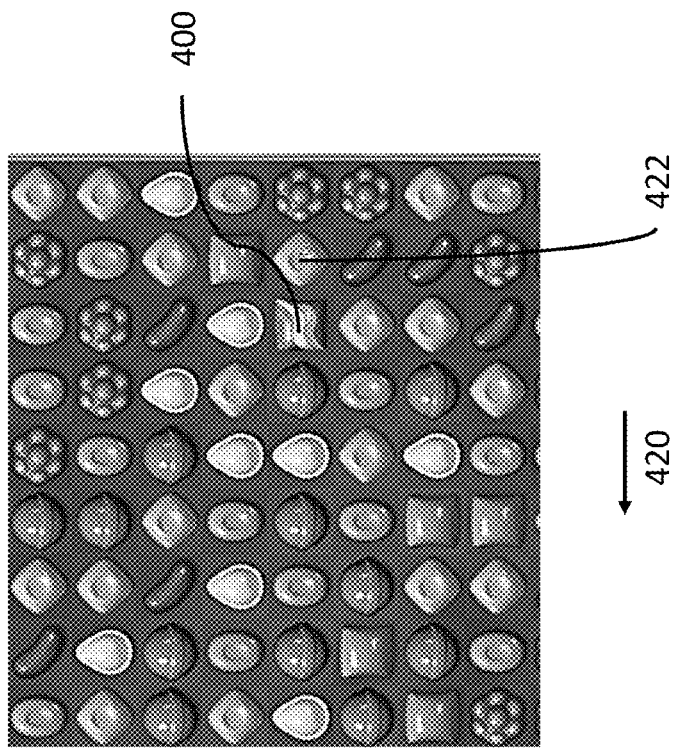
Figure 6C:
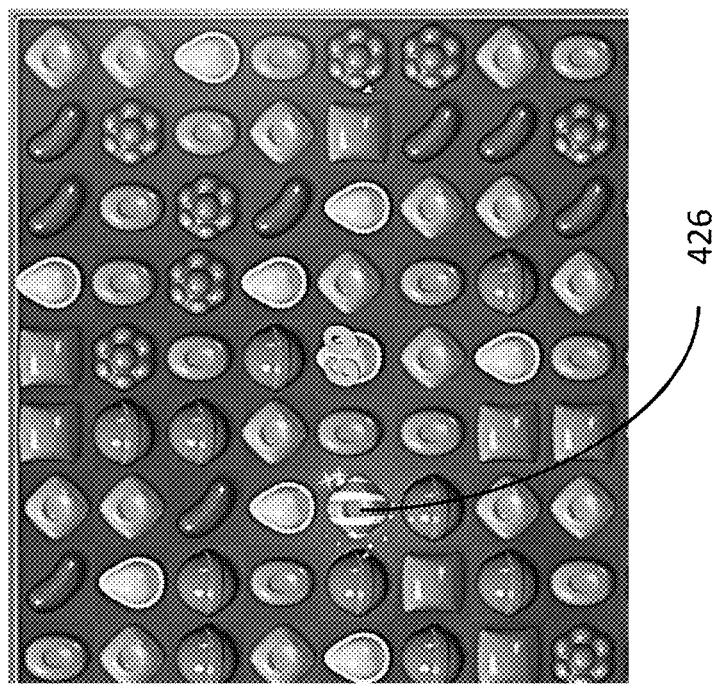

FIGS. 6a-c shows a similar game board progression to that of FIGS. 5a-e, but the determined direction 420 is to the left of the displayed game board, rather than to the right.

As can be seen from FIG. 6a, when the user causes game element 400 to be swapped with game element 422, a sequence of four game elements 424 having the same characteristic as game element 422 may be provided in a similar manner to that described previously, as shown in FIG. 6b. This sequence of four game elements 424 with the same characteristic may in turn be converted in to special game element 426 shown in FIG. 6c.

In some example embodiments, the method may comprise determining that the user engagement causes selecting and moving of one of one game element and the first game element providing the first additional effect to a position occupied by the other of the one game element and the first game element providing the first additional effect. The one game element may be configured to provide a second, different additional effect, and the method may comprise providing the one or more game elements along the determined direction each providing the second additional effect when triggered.

Figure 7B:
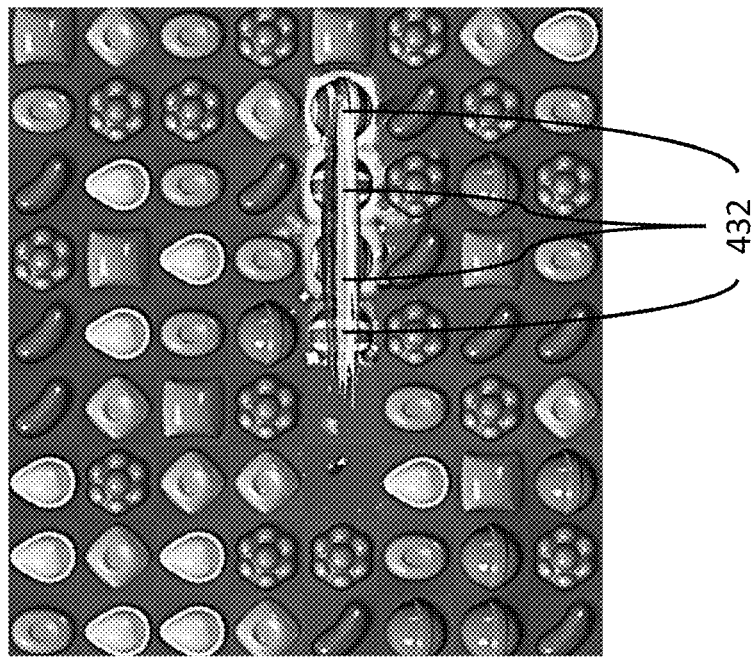
FIGS. 7a to 7c show a game board at different times during a move where the game element providing the additional effect is swapped with another game element providing a different additional effect.
Figure 7A:
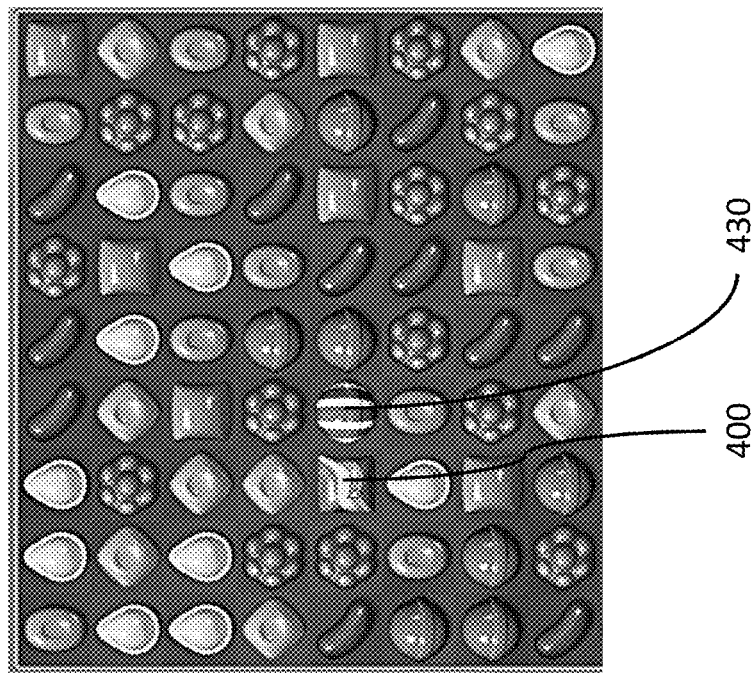
Figure 7C:
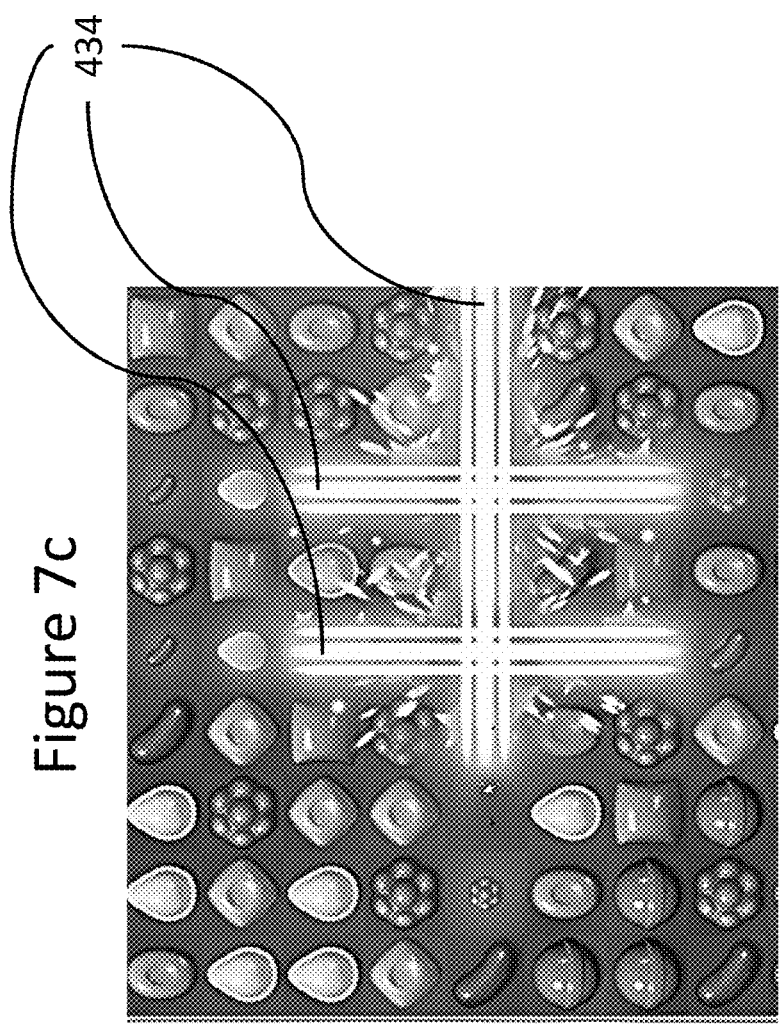

FIGS. 7a-c shows an example game board progression where the one game element has a second different additional effect.

In FIG. 7a, the first game element having the first additional effect when triggered is 400, and the second game element having the second additional effect when triggered is 430. In this example, the second game element is a "striped candy", which when triggered causes all game elements in either a row or column to be removed. It should be appreciated that different types of second game element providing different second additional effects may be provided, such as those shown in FIGS. 10a-d. The different game elements may be displayed in visually distinct manners from each other and the other game elements not providing an additional effect.

Returning to FIG. 7a, a user may engage with game elements 400 and 430, thereby causing the effect of game element 400 to be applied. As shown in FIG. 7b, this may cause four game elements 432 located in a line to the right of game elements 400 and 430 to be provided with the same second additional effect as game element 430. In the example of FIG. 7, this means that the four game elements 432 will be provided with the "striped candy" additional effect when triggered. The second additional effect of game elements 432 may then be triggered, which as described above with reference to the "striped candy", may cause all game elements in a same row or column as game elements 432 to be removed. This is shown by the animation 434 in FIG. 7c, whereby game elements in two columns and one row are removed from the game board.

Other examples of game elements providing different additional effects are shown in FIGS. 10 to 10d.

FIG. 10a shows a colouring candy. Matching this game element with, at least, other game elements of a given characteristic, will activate it. The coloring candy will burst and then spew out its coloring bubbles on all game elements that match the given characteristic.

FIG. 10b shows a jelly fish. Jelly fish are like normal candies in that they will have a normal colour and will need to be activated. When activated, they will swim off the screen and three (for example) new jelly fish swim onto the screen and "eat" three squares at random that contain a target object. The target object may be removed or a layer of a target blocker may be removed.

FIG. 10c shows a wrapped candy. When it is activated, it explodes and 8 surrounding candies (3×3 board space) are cleared. Then the game element that exploded will flash and wait until all elements are fully dropped and will explode a second time.

FIG. 10d shows the color bomb previously described.

Figure 8B:
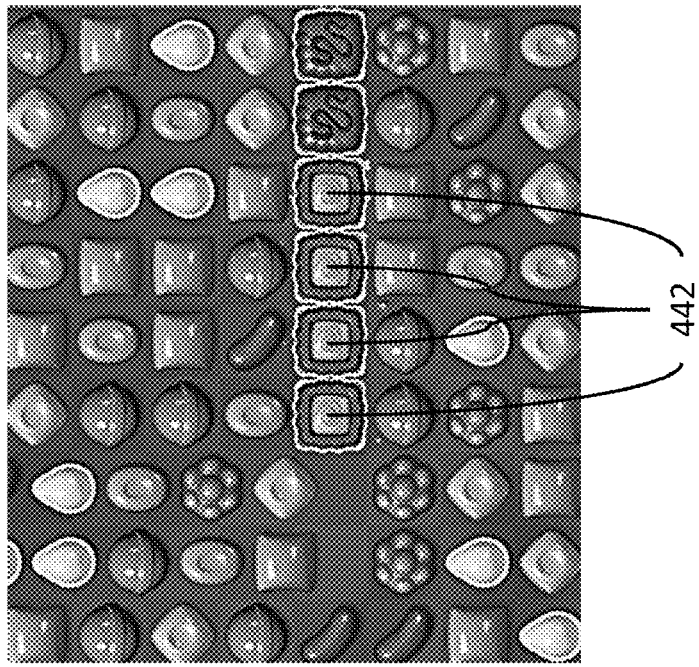
FIGS. 8a and 8b show a game board at different times during a move where the game element providing the additional effect is swapped with another game element adjacent to blocker game elements.
Figure 8A:
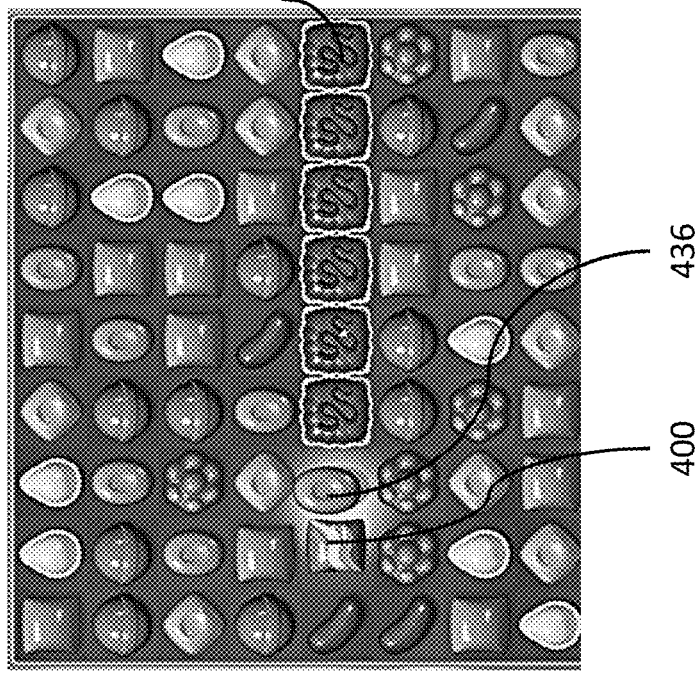

In some example embodiments, the one or more game elements in the determined direction may comprise one or more "blocker" game elements 440, such as those shown in FIGS. 8a and 8b.

A "blocker" game element may be a game element that itself cannot form part of a sequence. In order to remove a "blocker" game element from the game board, a user may have to create a sequence of game elements having a same characteristic, where at least one of the game elements in the sequence are adjacent to the "blocker" game element. When the user creates the sequence of game elements, the game elements forming the sequence may be removed, and any "blocker" game elements adjacent to the game elements forming the sequence may be unblocked. By unblocking a "blocker" game element, the "blocker" game element may be provided with a characteristic such that it can be used in a subsequent matching sequence in order for the user to remove the game element.

As shown in FIG. 8a, the first game element 400 having the first additional effect is positioned to the left of game element 436, which in turn is positioned to the left of "blocker" game elements 440.

When the user engages with game elements 400 and 436, thereby triggering the additional effect of game element 400 as described previously, the one or more game elements in the determined direction comprise the "blocker" game elements 440. In some example embodiments, as shown in FIG. 8b, the triggering of the additional effect of game object 400 may cause some of the "blocker" game elements 440 to become unblocked, as shown as game elements 442 in FIG. 8b.

In some example embodiments, the method may comprise determining that the user engagement causes selecting and moving of a first game element providing the first additional effect to a position occupied by a second game element providing the first additional effect. The method may comprise providing a first set of one or more game elements and a second set of one or more game elements.

Figure 9B:
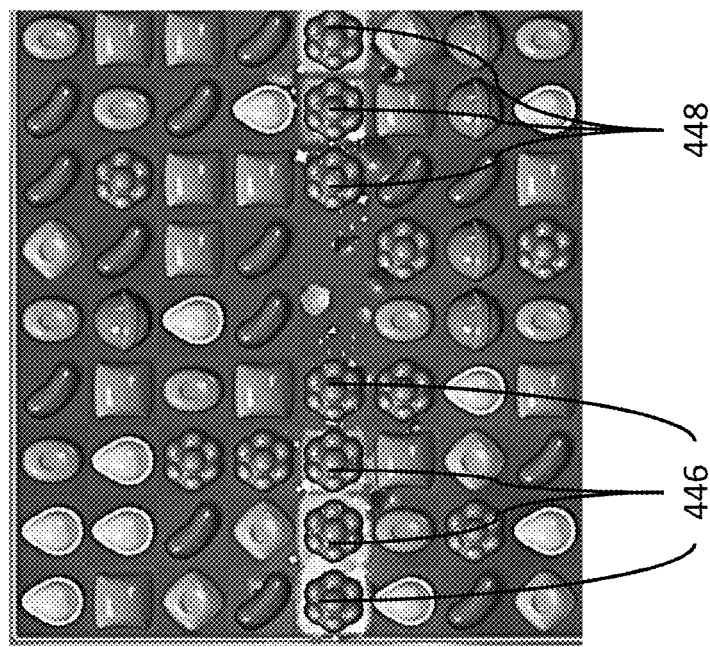
FIGS. 9a and 9b show a game board at different times during a move where the game element providing the additional effect is swapped with another game element also providing the additional effect.

The first set of one or more game elements and the second set of one or more game elements may be provided on opposite sides of the first and second game elements providing the first additional effect. An example of this is shown in FIGS. 9a and 9b.

Figure 9A:
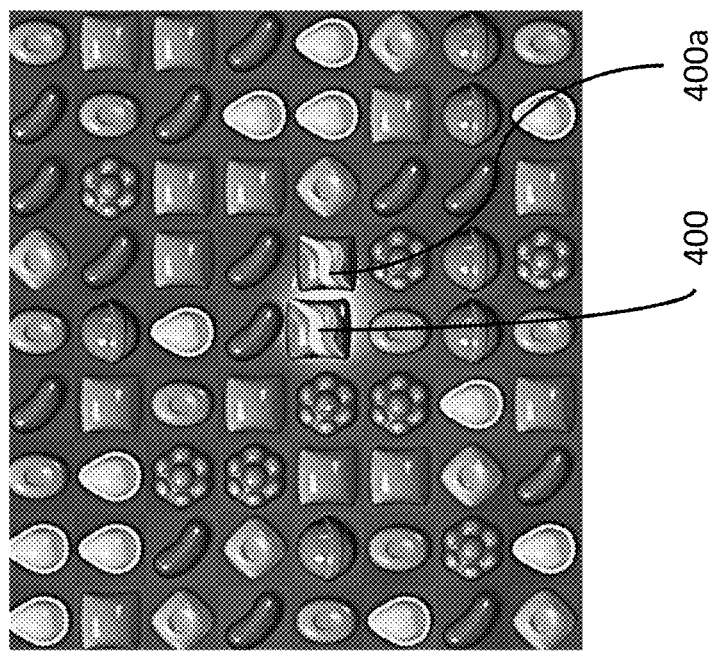

FIG. 9a shows a first game element 400 providing the first additional effect and a second game element 400a providing the first additional effect. When the user engages causes the selecting and moving of the first game element 400 to swap with the second game element 400a, a first set of one or more game elements 446 and a second set of one or more game elements 448 may be provided. As shown in FIG. 9b, the first set 446 and the second set 448 are provided in the same row but on opposite sides to the position of the first game element 400 and second game element 400a.

Some example embodiments have been described with reference to applying the first additional effect to four game elements along the determined direction. It should be understood that the additional effect may be applied to any number of game elements along the determined direction. For example, in some example embodiments, the additional effect may be applied to two, three, or five game elements.

In some example embodiments, the method may comprise determining a number of the one or more game elements along the determined direction based on a number of game elements that can be accommodated in the array.

For example, as shown in FIG. 9b, four game elements 446 may be provided to the left of the position of game object 400. However, only three game elements 448 may be provided to the right of the position of game object 400a, as the game area does not extend far enough to accommodate four game elements in the array.

Figure 11:
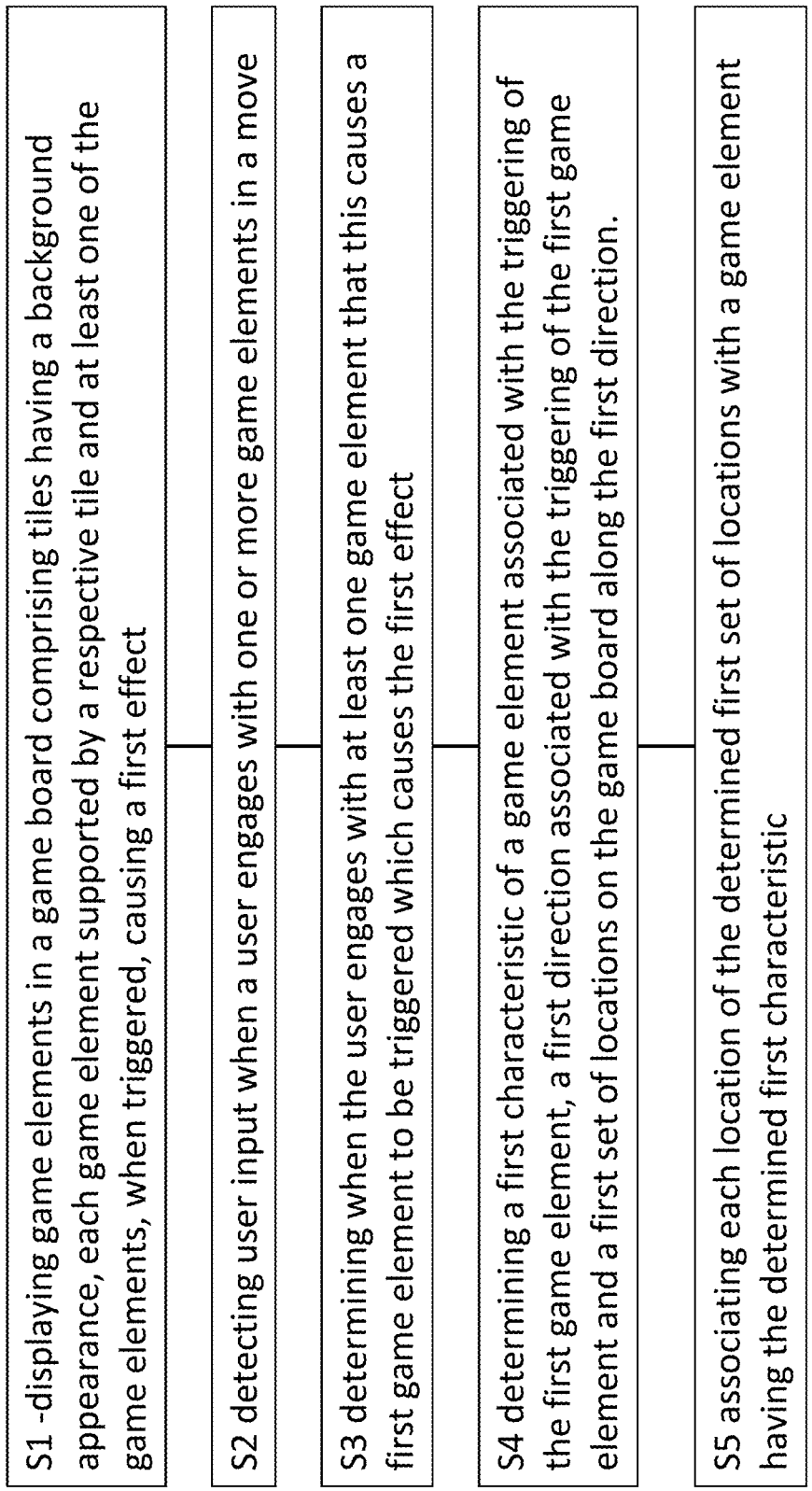
FIG. 11 shows a method of some embodiments.

Reference is made to FIG. 11, which shows an example method according to some embodiments.

In S1, the method comprises displaying game elements in a game board comprising tiles having a background appearance, each game element supported by a respective tile and at least one of the game elements, when triggered, causing a first effect.

This may first or additional effect may be as previously described.

This may be displayed on the display of the user device. This may be caused by at least one processor of the user device.

In S2, the method comprises detecting user input when a user engages with one or more game elements in a move.

The user input may be via a user interface of the user device.

In S3, the method comprises determining when the user engages with at least one game element that this causes a first game element to be triggered which causes the first effect.

This may be determined by the at least one processor of the user device.

In S4, the method comprises, in response to determining that the first game element associated with the first effect is triggered, determining a first characteristic of a game element associated with the triggering of the first game element, a first direction associated with the triggering of the first game element and a first set of locations on the game board along the first direction.

Each location of the determined first set of locations may be associated with a displayed respective game element having a respective characteristic.

The determining of the direction and the characteristic may take place in any order or at the same time. The first set of locations may be determined before or after the determining of the first characteristic.

S4 may be performed by at least one processor of the user device.

In S5, the method comprises associating each location of the determined first set of locations with a game element having the determined first characteristic.

S5 may be performed by at least one processor of the user device.

The method may comprise identifying a set of locations on the game board along the first direction and determining by the at least one processor, the first set of locations based on the identified set of locations.

The first set of locations may be a subset of the set of locations and comprise only some of the set of locations.

The first set of locations may be the same as the set of locations and comprise all of the set of locations.

The first set of locations may be adjacent one another. In some embodiments, the first set of locations may be not be adjacent one another. For example there may be one or more blockers which are provided between two game elements of the first set.

In some embodiments, there may be a predefined number of locations as the identified set of locations and/or as the first set of locations. As mentioned previously, this number may be four or more or less than four.

In some embodiments, there may be up to a predefined maximum number of locations in the identified set of locations or in the first set of locations. For example, where a move is made near the edge of the game board, there may be a fewer number of locations in the set of locations or the first set of locations. In some embodiments, one or more blocker game elements may limit the number of number of game elements which may be provided in the first set or which identified.

The predefined maximum number may be four. The predefined maximum number may be more or less than four in other embodiments.

The method may comprise determining, by the at least one processor, if a characteristic of one or more of the displayed respective game elements associated with the identified set of locations on the game board along the first direction is a blocking characteristic.

The method may comprise determining, by the at least one processor, the first set of locations based on the identified set of locations based on one or more criteria. The criteria may be that a respective location is not associated with a respective game element having a blocking characteristic.

The determined first set of locations may be determined with respect to a location of the first game element.

At least one of the game elements associated with a respective location of the determined first set of locations may be provided with one or more further characteristics.

The further characteristic may be a line blasting characteristic associated with one or more directions.

At least one of the game elements associated with a respective location of the determined first set of locations may cause a different effect when triggered.

The different effect may be a line blasting effect or a spreading effect associated with one or more directions or any of the different effect discussed in relation to FIG. 10.

The method may comprise causing, by the at least one processor, to cause the display to display an updated game board with the respective associated game element having the determined first characteristic displayed at a respective location of the determined first set of locations.

In some embodiments, the data for a game board may be stored in a data structure. Different positions of the data structure may be associated with different positions on the game board. In other embodiments, position data may be stored with information about the game elements. The data structure will provide information about the game element. The data will define the appearance of the game element and the one or more characteristics with which it is displayed. In some embodiments, the data will also indicate any effect associated with the game element. This may be implicit in the data defining the game element or may be separately indicated.

This data structure will be stored in at least one memory of the user device.

When a game elements of the first set are to have the determined characteristic, the data in the data structure for those game element will be updated to reflect this. This may comprise modifying the data in the data structure or generating new data to replace the data associated with that game board position. The data associated with the previously displayed game element will be removed from the data structure.

The method may comprise generating at least one new game element having the first characteristic to replace a respective game element in the first set of locations.

The method may comprise determining, by the at least one processor, whether the user input causes a match condition to be satisfied.

The method may comprise determining, by the at least one processor, whether the game elements having the first characteristic associated with the determined first set of locations causes a match condition to be satisfied. This may be before and/or after the game board has been replenished.

The method may comprise determining, by the at least one processor, the first characteristic based on a characteristic of the at least one game element that the user engages with to cause the triggering of the first game element to cause the first effect The method may comprise determining, by the at least one processor, that the user engagement with at least one game element causes that game element to swap position with the first game element to trigger the first game element to provide the first effect.

The method may comprise determining, by the at least one processor, the first direction dependent on a direction associated with the user input causing the triggering of the first game element which causes the first effect.

The method may comprise determining, by the at least one processor, the first direction dependent on the at least one game element that the user interacts with that causes the triggering of the first game element which causes the first effect.

The method may comprise determining, by the at least one processor, the first direction in dependence on a direction associated with one or more game elements which cause the first game element to be triggered.

It should be appreciated that embodiments may be applied to any other suitable type of matching game of the matching genre.

Some example embodiments may provide methods for introducing complexity into computer implemented games. This may be particularly challenging when considering small screen devices, where complex game arrangements may be difficult to display due to the limitations imposed by the devices in terms of processing capability and display size. By providing any of the abovementioned methods, some example embodiments may allow strategic diversity in gameplay, and therefore introduce a further level of complexity to the computer implemented game, without placing undue burden on processing or display requirements. As such, some embodiments may also drive user engagement with the computer implemented game by making the game more complex and challenging.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device comprising:
a display configured to display game elements in a game board comprising tiles having a background appearance, each game element supported by a respective tile and at least one of the game elements, when triggered, causing a first effect;
a user interface configured to detect user input when a user engages with one or more game elements in a move; and
at least one processor configured:
to determine when the user engages with at least one game element that this causes a first game element to be triggered which causes the first effect;
to, in response to determining that the first game element associated with the first effect is triggered, determine a first characteristic of a game element associated with the triggering of the first game element,
determine a first direction associated with the triggering of the first game element; and
determine a first set of locations on the game board along the first direction, each location of the determined first set of locations associated with a displayed respective game element having a respective characteristic;
wherein the at least one processor is configured to associate each location of the determined first set of locations with a game element having the determined first characteristic and to determine the first direction dependent on a direction associated with the user input causing the triggering of the first game element which causes the first effect.

2. The computer device as claimed in claim 1, wherein the at least one processor is configured to identify a set of locations on the game board along the first direction and to determine the first set of locations based on the identified set of locations.

3. The computer device as claimed in claim 2, wherein the at least one processor is configured to determine if a characteristic of one or more of the displayed respective game elements associated with the identified set of locations on the game board along the first direction is a blocking characteristic.

4. The computer device as claimed in claim 2, wherein the at least one processor is configured to determine the first set of locations based on the identified set of locations based on one or more criteria.

5. The computer device as claimed in claim 1, wherein the at least one processor is configured to determine a predefined number of locations as the first set of locations.

6. The computer device as claimed in claim 1, wherein the determined first set of locations are determined with respect to a location of the first game element.

7. The computer device as claimed in claim 1, wherein at least one of the game elements associated with a respective location of the determined first set of locations is provided with one or more further characteristics.

8. The computer device as claimed in claim 1, wherein the at least processor is configured to cause the display to display an updated game board with the respective associated game element having the determined first characteristic displayed at a respective location of the determined first set of locations.

9. The computer device as claimed in claim 1, further comprising at least one memory configured to store for each game element, one or more of data defining a characteristic of the respective game element, data defining a location on the game board of the respective game element, and optionally data indicating one or more effects associated with the triggering of the respective game element.

10. The computer device as claimed in claim 9, wherein the at least one processor is configured to update the data stored in the at least one memory for a respective game element with the first characteristic.

11. The computer device as claimed in claim 9, wherein the at least one processor is configured to remove data from the at least one memory, the data associated with a respective game element in a respective location of the first set of locations and replace that data in the memory with data associated with a game element having the first characteristic.

12. The computer device as claimed in claim 1, wherein the at least processor is configured to modify a characteristic of a displayed respective game element to the first characteristic.

13. The computer device as claimed in claim 1, wherein the at least one processor is configured to generate data for at least one new game element having the first characteristic to replace data stored in the at least one memory for a respective game element in the first set of locations.

14. The computer device as claimed in claim 1, wherein the at least one processor is configured to determine whether the user input causes a match condition to be satisfied.

15. The computer device as claimed in claim 1, wherein the at least one processor is configured to determine whether the game elements having the first characteristic associated with the determined first set of locations causes a match condition to be satisfied.

16. The computer device as claimed in claim 1, wherein the at least one processor is configured to determine the first characteristic based on a characteristic of the at least one game element that the user engages with to cause the triggering of the first game element to cause the first effect.

17. The computer device as claimed in claim 1, wherein the at least one processor is configured to determine the first direction dependent on the at least one game element that the user interacts with that causes the triggering of the first game element which causes the first effect.

18. The computer device as claimed in claim 1, wherein the at least one processor is configured to determine the first direction in dependence on a direction associated with one or more game elements which cause the first game element to be triggered.

19. The computer device as claimed in claim 1, comprising at least one memory configured to store data for each game element in association with respective tile data.

20. The computer device as claimed in claim 1, wherein the at least one processor is configured to cause the display to display the game elements in an arrangement on the game board comprising columns and rows, wherein the first direction comprises a direction along a row or along a column in the arrangement.

21. The computer device as claimed in claim 1, wherein the at least one processor is configured to determine a second direction associated with the first effect, determine a second set of locations on the game board along the second direction, each location of the determined second set of locations associated with a displayed respective game element having a respective characteristic, and associate each location of the determined second set of locations with a game element having the determined first characteristic.

22. A computer implemented method comprising:
causing, by at least one processor of a computer device, display by a display of the computer device, game elements in a game board comprising tiles having a background appearance, each game element supported by a respective tile and at least one of the game elements, when triggered, causing a first effect;
detecting, via a user interface of the computer device, user input when a user engages with one or more game elements in a move;
determining, by the at least processor, when the user engages with at least one game element that this causes a first game element to be triggered which causes the first effect; and
in response to determining that the first game element associated with the first effect is triggered,
determining, by the at least processor, a first characteristic of a game element associated with the triggering of the first game element,
determining, by the at least processor, a first direction associated with the triggering of the first game element; and
determining, by the at least processor, a first set of locations on the game board along the first direction, each location of the determined first set of locations associated with a displayed respective game element having a respective characteristic;
wherein the method comprises associating, by the at least one processor, each location of the determined first set of locations with a game element having the determined first characteristic and determining the first direction dependent on a direction associated with the user input causing the triggering of the first game element which causes the first effect.

23. A non-transitory computer readable storage device storing instructions that, when executed by at least one processor of a computer device causes the at least one processor to:
cause display by a display of the computer device, game elements in a game board comprising tiles having a background appearance, each game element supported by a respective tile and at least one of the game elements, when triggered, causing a first effect;
detect, via a user interface of the computer device, user input when a user engages with one or more game elements in a move;
determine when the user engages with at least one game element that this causes a first game element to be triggered which causes the first effect;
in response to determining that the first game element associated with the first effect is triggered,
determine a first characteristic of a game element associated with the triggering of the first game element,
determine a first direction associated with the triggering of the first game element dependent on a direction associated with the user input causing the triggering of the first game element which causes the first effect; and
determine a first set of locations on the game board along the first direction, each location of the determined first set of locations associated with a displayed respective game element having a respective characteristic; and
associate each location of the determined first set of locations with a game element having the determined first characteristic.

24. A computer device comprising:
a display configured to display game elements in a game board comprising tiles having a background appearance, each game element supported by a respective tile and at least one of the game elements, when triggered, causing a first effect;
a user interface configured to detect user input when a user engages with one or more game elements in a move; and
at least one processor configured:
to determine when the user engages with at least one game element that this causes a first game element to be triggered which causes the first effect;
to, in response to determining that the first game element associated with the first effect is triggered,
determine a first characteristic of a game element associated with the triggering of the first game element,
determine a first direction associated with the triggering of the first game element; and
determine a first set of locations on the game board along the first direction, each location of the determined first set of locations associated with a displayed respective game element having a respective characteristic;

wherein the at least one processor is configured to associate each location of the determined first set of locations with a game element having the determined first characteristic and to determine the first characteristic based on a characteristic of the at least one game element that the user engages with to cause the triggering of the first game element to cause the first effect.

25. A computer implemented method comprising:

causing, by at least one processor of a computer device, display by a display of the computer device, game elements in a game board comprising tiles having a background appearance, each game element supported by a respective tile and at least one of the game elements, when triggered, causing a first effect;

detecting, via a user interface of the computer device, user input when a user engages with one or more game elements in a move;

determining, by the at least processor, when the user engages with at least one game element that this causes a first game element to be triggered which causes the first effect; and in response to determining that the first game element associated with the first effect is triggered, determining, by the at least processor, a first characteristic of a game element associated with the triggering of the first game element, determining, by the at least processor, a first direction associated with the triggering of the first game element; and determining, by the at least processor, a first set of locations on the game board along the first direction, each location of the determined first set of locations associated with a displayed respective game element having a respective characteristic;

wherein the method comprises associating, by the at least one processor, each location of the determined first set of locations with a game element having the determined first characteristic and determining the first characteristic based on a characteristic of the at least one game element that the user engages with to cause the triggering of the first game element to cause the first effect.

26. A non-transitory computer readable storage device storing instructions that, when executed by at least one processor of a computer device causes the at least one processor to:

cause display by a display of the computer device, game elements in a game board comprising tiles having a background appearance, each game element supported by a respective tile and at least one of the game elements, when triggered, causing a first effect;

detect, via a user interface of the computer device, user input when a user engages with one or more game elements in a move;

determine when the user engages with at least one game element that this causes a first game element to be triggered which causes the first effect;

in response to determining that the first game element associated with the first effect is triggered, determine a first characteristic of a game element associated with the triggering of the first game element based on a characteristic of the at least one game element that the user engages with to cause the triggering of the first game element to cause the first effect, determine a first direction associated with the triggering of the first game element; and determine a first set of locations on the game board along the first direction, each location of the determined first set of locations associated with a displayed respective game element having a respective characteristic; and associate each location of the determined first set of locations with a game element having the determined first characteristic.

* * * * *